July 8, 1958  E. R. ROSS  2,842,229
INTERNAL EXPANDING BRAKE
Filed Jan. 18, 1954
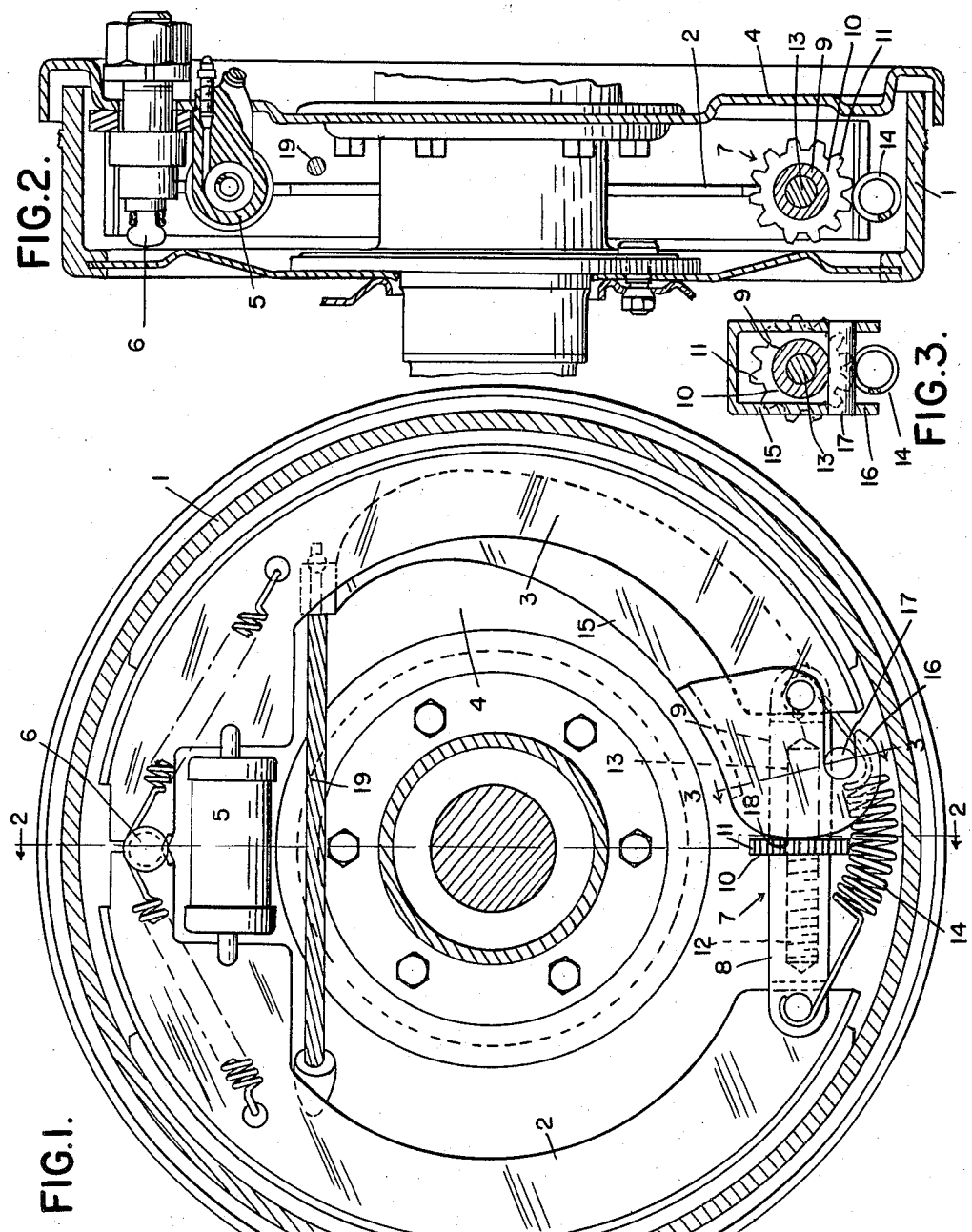
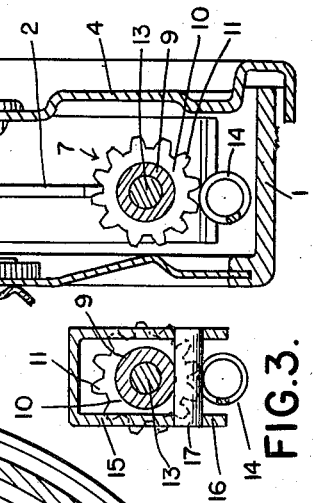
*INVENTOR.*
ELMER R. ROSS
BY
ATTORNEYS

2,842,229

INTERNAL EXPANDING BRAKE

Elmer R. Ross, Detroit, Mich., assignor to Kelsey-Hayes Company, a corporation of Delaware Application January 18, 1954, Serial No. 404,415

3 Claims. (Cl. 188—79.5)

The invention relates to brakes and refers more particularly to brakes for motor vehicle wheels.

The invention has for one of its objects to provide an improved brake having an adjustment device for securing desired brake clearance and an operator operatively connected to members of the adjustment device for applying the brake.

The invention has for another object to so construct the adjustment device and operator that they form a compact assembly.

These and other objects of the invention will become apparent from the following description taken in connection with the accompanying drawings in which—

Figure 1 is a section of a brake taken on a plane inside the web of the brake drum and embodying the invention;

Figures 2 and 3 are cross sections on the lines 2—2 and 3—3, respectively, of Figure 1.

As illustrated in the drawings the brake comprises the brake drum 1, the pair of brake shoes 2 and 3 forming the friction device and the backing plate 4. The brake drum is designed to be mounted on the hub of a motor vehicle wheel while the backing plate is designed to be mounted on an axle housing or wheel knuckle. The brake shoes are of T-section and provided with linings secured to their rims for frictionally engaging the annular brake flange of the brake drum.

A suitable actuator such as the wheel cylinder 5 may be employed for normally applying the brake. This wheel cylinder is mounted on the backing plate 4 between adjacent ends of the shoes 2 and 3 which are adapted to anchor on the anchor pin 6 mounted on the backing plate radially outwardly of the wheel cylinder.

For adjusting the shoes to secure the desired clearance between the shoe linings and the annular brake flange of the drum, I have provided the adjustment device 7 between the ends of the shoes opposite the wheel cylinder 5. The adjustment device comprises the end members 8 and 9 and the intermediate member 10. The end members are pivotally connected at their remote ends to the shoe ends and have axially aligned bores. The intermediate member has the peripherally notched wheel 11 and the axially aligned shanks 12 and 13 at its opposite sides, the shank 12 being a screw threadedly engaging the bore of the end member 8 and the shank 13 having a smooth cylindrical surface slidably engaging the bore of the end member 9. The adjusting wheel 11 normally abuts the adjacent end of the end member 9 and is held normally against this end by the coil spring 14 connected at its ends to the adjacent ends of the shoes. The spring engages a peripheral notch of the wheel to normally hold the wheel in a rotative position which can be secured by manipulating a suitable tool such as a screw driver which may be inserted through a slot in the backing plate.

The operator associated with the parts of the adjustment device 7 is designed particularly in making an emergency brake application or a parking brake application. In detail, the operator is a lever 15, preferably formed of a stamping, having a portion of channel-section embracing the end member 9 of the adjustment device and the adjacent part of the web of the shoe 3. The lever is operatively connected to the end member 9 and the intermediate member 10 by being fulcrumed thereon. The lever has the curved prongs 16 extending partially around and abutting the aligned pivots 17, preferably formed integrally with the end member 9, and also has the convex cam surfaces 18 for abutting the adjusting wheel 11 at the opposite sides of the end member 9. The lever is adapted to be actuated by suitable means such as the cable 19 extending through the backing plate and connected to the free end of the lever.

From the above description it will be seen that I have provided a simple construction of brake having a compact arrangement of an adjustment device for securing desired brake clearance and an operator operatively connected to the members of the adjustment device for applying the brake.

What I claim is:

1. A brake comprising a brake drum, brake shoes within and engageable with said drum, a device between adjacent ends of said shoes for adjusting the same, said device having members pivotally connected to said shoes and a rotatable member having a shank threadedly engaging one of said first mentioned members, a second shank slidably engaging the other of said first mentioned members and a wheel on said rotatable member abutting said other of said first mentioned members, and a lever operatively connected to said other of said first mentioned members and said wheel for moving apart said other of said first mentioned members and said wheel to move said shoes into engagement with said drum.

2. A brake comprising a brake drum, brake shoes within and engageable with said drum, an adjustment device for said shoes having members pivotally connected to said shoes and a third member threadedly engaging one of said first mentioned members and slidably engaging and normally abutting the other of said first mentioned members, and a lever fulcrumed on said third member and said other of said first mentioned members for moving apart said third member and said other of said first-mentioned members to move said shoes against said drum.

3. A brake comprising a brake drum, a pair of brake shoes within and engageable with said drum, an adjustment device for said shoes having members pivotally connected to said shoes and a third member threadedly connected to one of said first mentioned members and slidably engaging and normally abutting the other of said first mentioned members, and a lever fulcrumed on said other of said first mentioned members and having a cam surface abutting said third member operable to move apart said other of said first mentioned members and said third member upon fulcrum movement of said lever to move said shoes against said drum.

References Cited in the file of this patent

UNITED STATES PATENTS

| | | |
|---|---|---|
| 2,072,014 | Smith | Feb. 23, 1937 |
| 2,104,702 | Bowers et al. | Jan. 4, 1938 |
| 2,223,546 | Bowen | Dec. 3, 1940 |
| 2,379,144 | Goepfrich et al. | June 26, 1945 |